United States Patent

[11] 3,609,715

[72] Inventor Donal A. Meier
Inglewood, Calif.
[21] Appl. No. 588,949
[22] Filed Oct. 24, 1966
[45] Patented Sept. 28, 1971
[73] Assignee The National Cash Register Company
Dayton, Ohio

[54] STRIP LINE, FOLDED ARRAY, THIN FILM MAGNETIC ROD MEMORY
22 Claims, 17 Drawing Figs.

[52] U.S. Cl. .......... 340/174
TF, 340/174 M, 340/174 LA, 340/174 HP, 340/174 PW, 340/174 VA, 340/174 QB, 340/174 BC, 340/174 NC
[51] Int. Cl. .......... G11c 5/04, G11c 11/14
[50] Field of Search .......... 340/174
TF, 174 TW, 174 MA

[56] References Cited

UNITED STATES PATENTS

| | | | |
|---|---|---|---|
| 3,060,411 | 10/1962 | Smith | 340/174 |
| 3,175,200 | 3/1965 | Hoffman et al. | 340/174 |
| 3,235,853 | 2/1966 | Luebbe | 340/174 |
| 3,290,512 | 12/1966 | Tillman et al. | 340/174 |
| 3,371,326 | 2/1968 | Fedde | 340/174 |
| 3,418,644 | 12/1968 | Higashi et al. | 340/174 |

*Primary Examiner*—Stanley M. Urynowicz, Jr.
*Attorneys*—Louis A. Kline and Joseph R. Dwyer

ABSTRACT: A memory unit is disclosed in which a planar array of thin film magnetic rod structures is sandwiched between a pair of magnetic sheets. Solenoid windings wound along the length of the rod structure serve as word windings and conductive wires disposed perpendicular to the rod structures and between the sheets serve as digit windings or the plurality of bistable magnetic storage elements formed along the rod structures at the intersections of the conductive wires. The magnetization of each of the storage elements is axially switched to a predetermined one of its two stable states by simultaneously passing appropriate currents through the relevant solenoid winding and conductive wires. A plurality of such units are assembled together to form a three-dimensional memory matrix.

In constructing such a memory a number of magnetic sheets are placed side by side and a plurality of unbroken conductive wires are laid in grooves in the sheets each of the wires running across all the sheets. The memory is then formed by appropriate folding of the conductive wires and the sheets with the magnetic rod structures sandwiched between the sheets and the conductive wires acting as hinges.

INVENTOR
DONAL A. MEIER
BY Louis A. Kline
John J. Matlago
Nathan Cass
HIS ATTORNEYS FIG. 4
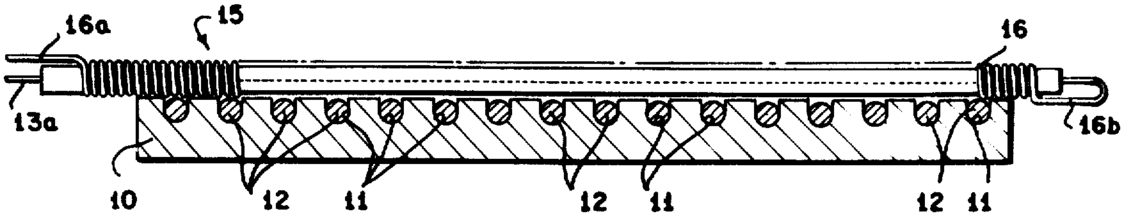
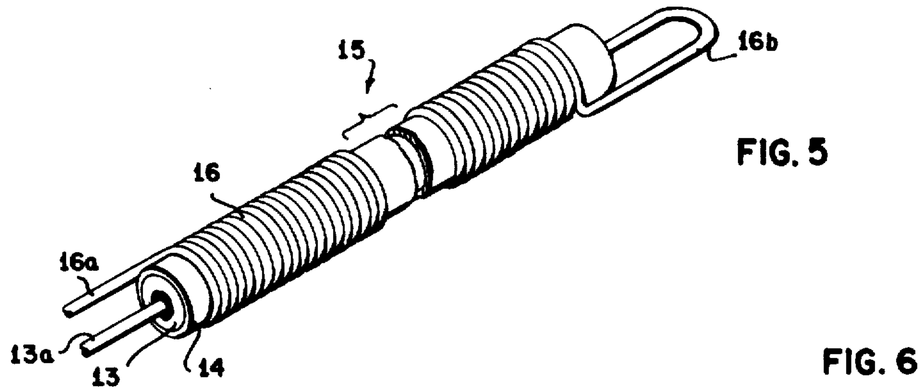
FIG. 5
FIG. 6
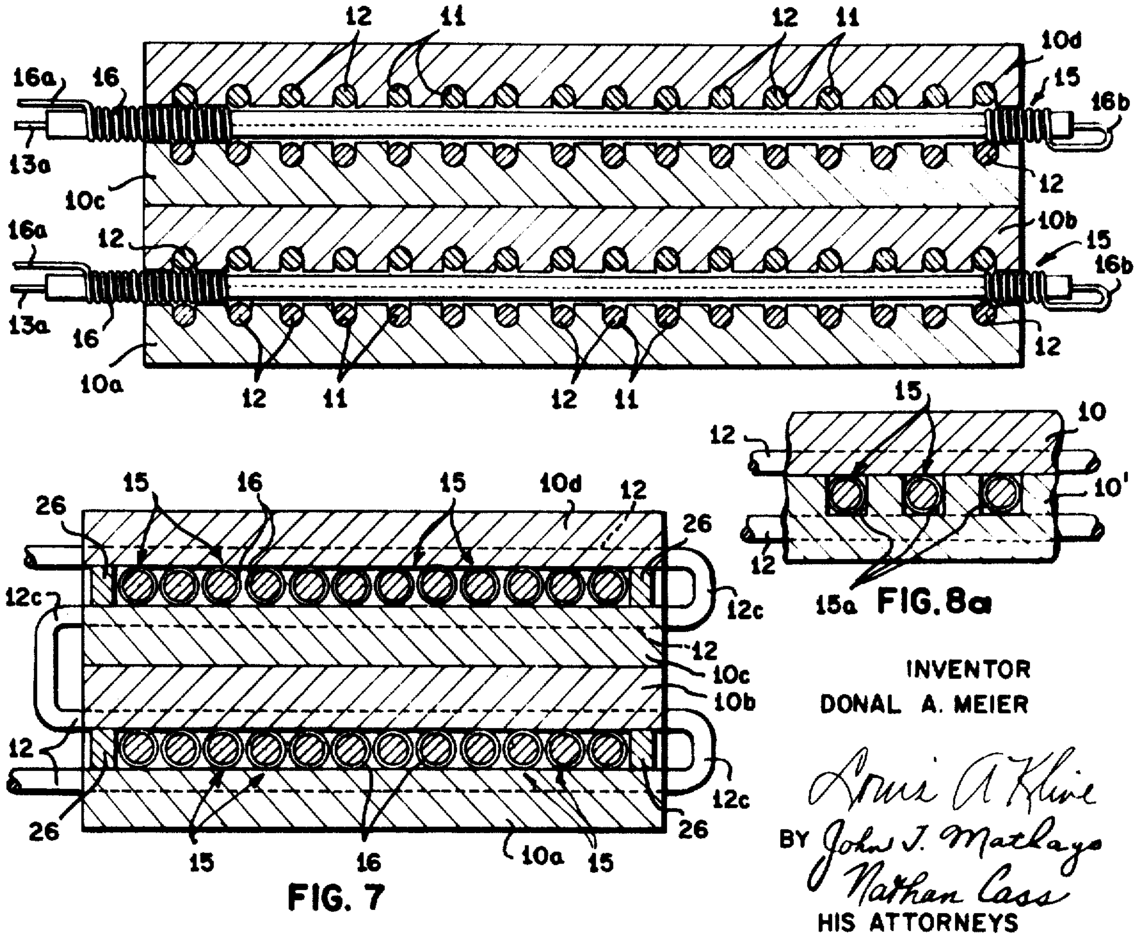
FIG. 6, FIG. 7, FIG. 8a
INVENTOR
DONAL A. MEIER
BY Louis A. Kline
John J. Mathaye
Nathan Cass
HIS ATTORNEYS

INVENTOR
DONAL A. MEIER

BY
HIS ATTORNEYS

INVENTOR
DONAL A. MEIER
BY Louis A. Kline
John T. Matlago
Nathan Cass
HIS ATTORNEYS

INVENTOR
DONAL A. MEIER

BY Louis A Kline
John J. Matlago
Nathan Cass
HIS ATTORNEYS

INVENTOR
DONAL A. MEIER

BY Louis A. Kline
John J. Matlago
Nathan Cass
HIS ATTORNEYS

STRIP LINE, FOLDED ARRAY, THIN FILM MAGNETIC ROD MEMORY

The present invention relates generally to digital computer memory systems, and more particularly to an improved magnetic memory arrangement and construction.

With the ever increasing use of digital computers, considerable expenditure and effort has been directed towards providing improved memories for use therewith. It is the broad object of the present invention to further advance the state of the art of such memory systems.

A more specific object of the invention is to provide an improved thin film magnetic memory construction capable of high speed operation in both destructive and nondestructive modes using binary or ternary storage.

Another object of the invention in accordance with one or more of the foregoing objects is to provide an improved memory incorporating thin film rod elements operating in substantially an axial mode.

A further object of the invention in accordance with one or more of the foregoing objects is to provide a thin film rod memory having a high packing density.

A still further object of the invention is to provide in accordance with one or more of the foregoing objects a new and highly economical construction method for making a thin film magnetic rod memory.

Briefly, the above objects are accomplished in accordance with an exemplary embodiment of the invention in which thin film magnetic rods are constructed and arranged in a folded or sandwich array construction with each plane of rods being sandwiched between a respective pair of magnetic keeper planes. A first coordinate set of windings is obtained by providing each rod with a solenoid winding extending along the length thereof, and a second coordinate set of windings is obtained by providing parallel wires or strip lines in the sandwich disposed perpendicular to the rods in receiving slots or grooves provided in he keeper planes.

The specific nature of the invention as well as other objects, uses and advantages thereof will become apparent from the following description of an exemplary embodiment of the invention taken in conjunction with the accompanying drawings in which.

Figure 2A:
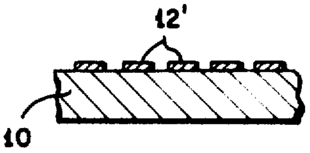
FIG. 2 is a cross-sectional view taken along the line 2—2 in FIG. 1.
Figure 3:
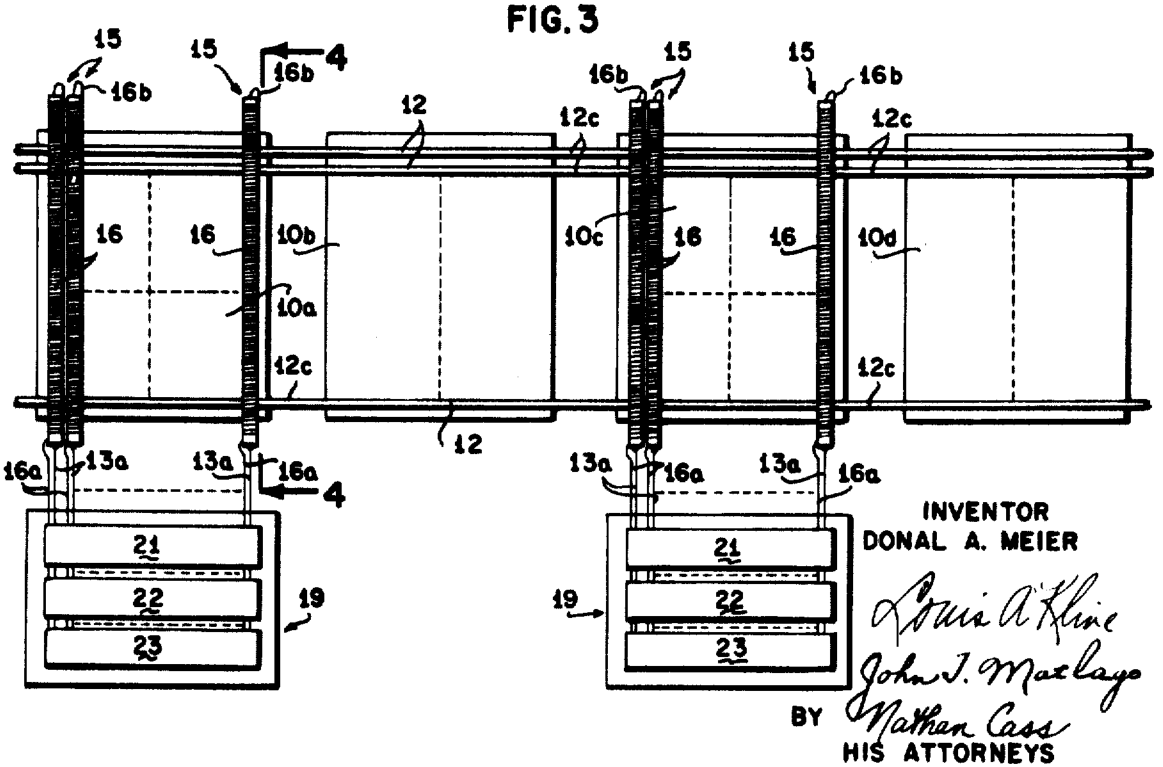
Figure 8:
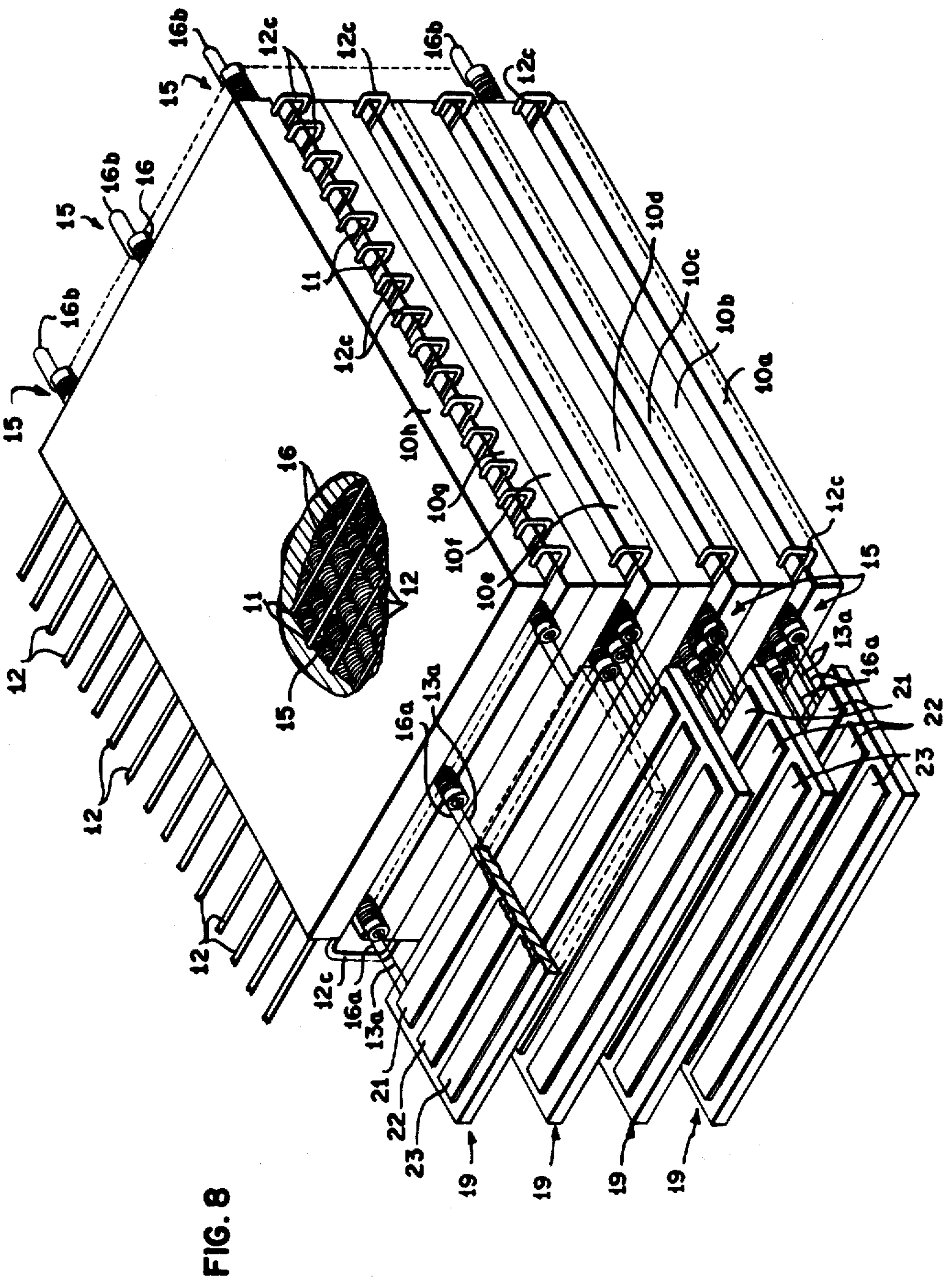
Figures 9, 15:
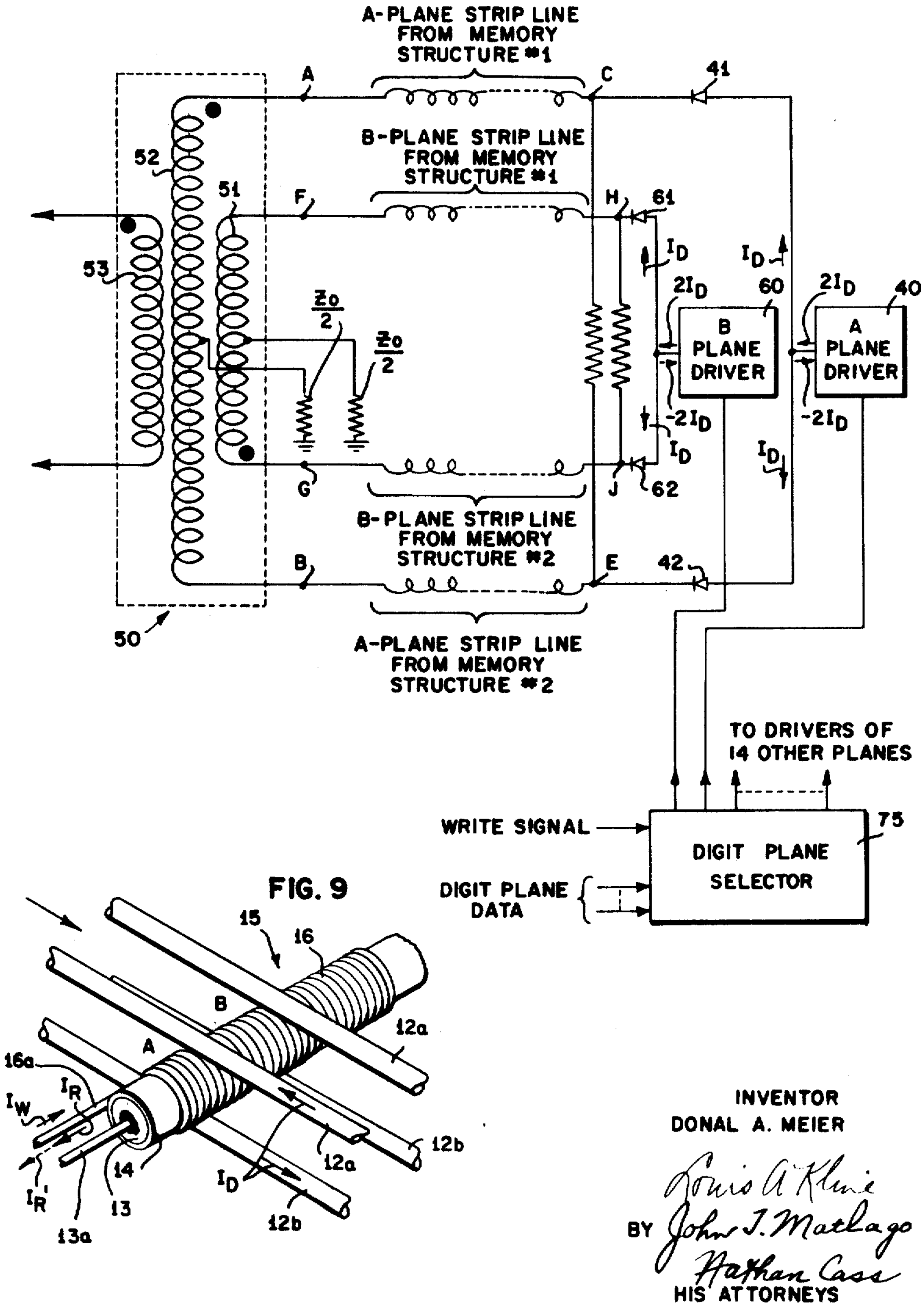
Figure 11:
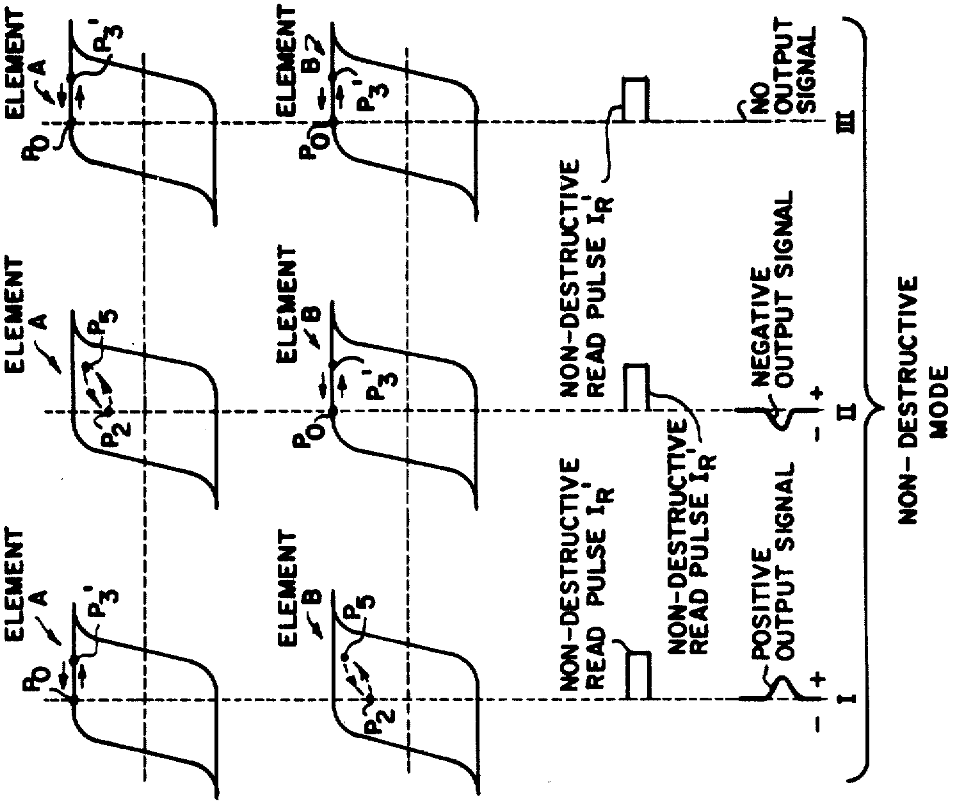
Figure 10:
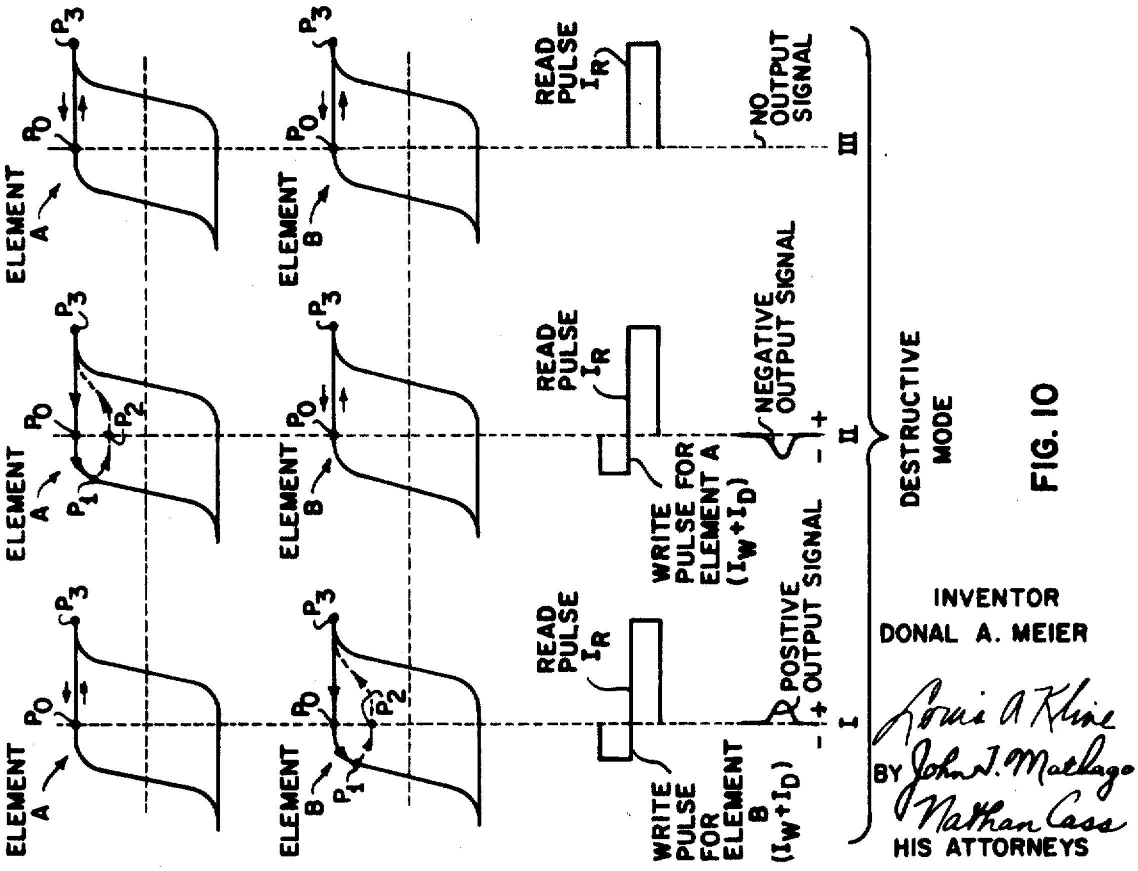
Figure 12:
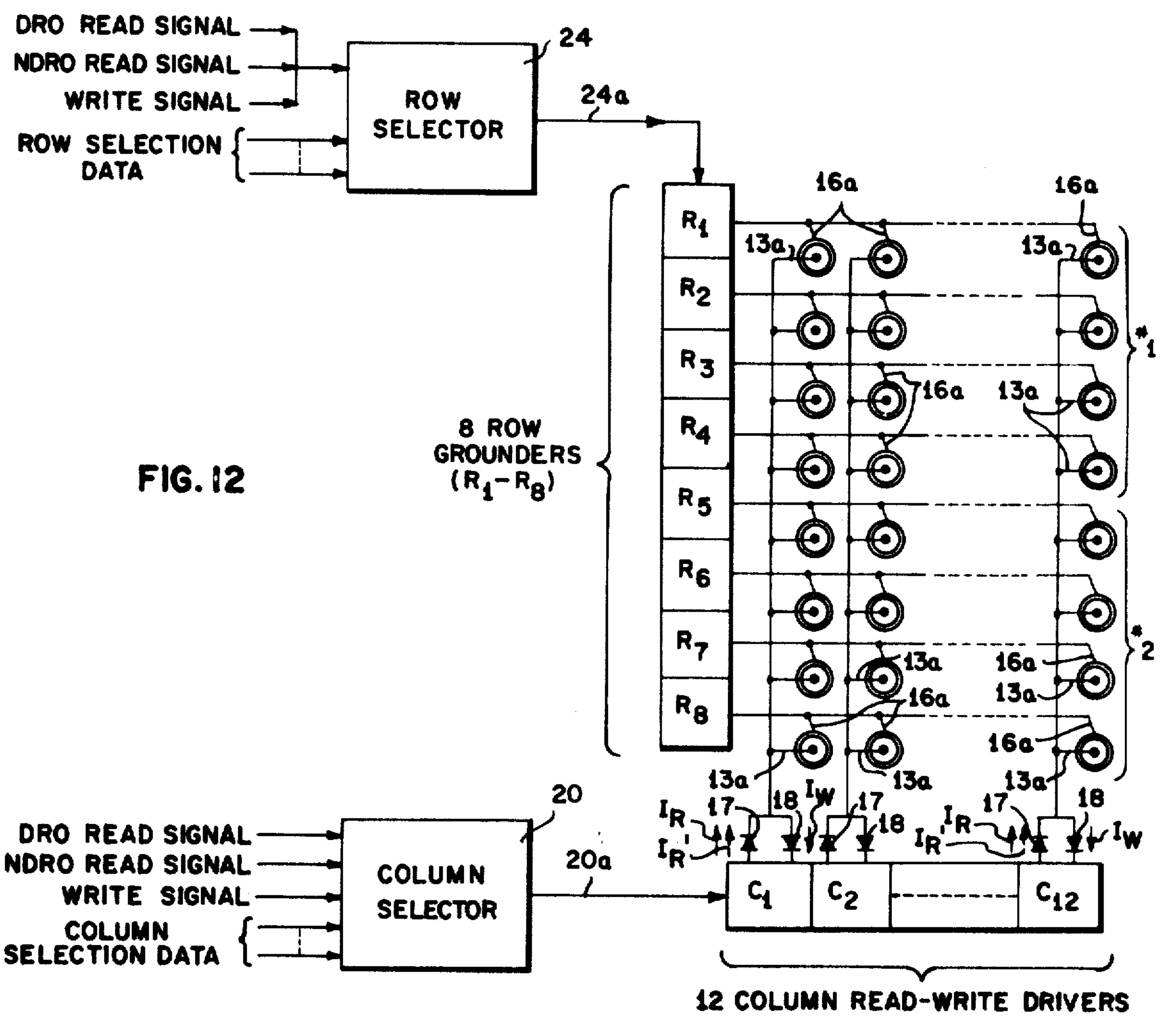
Figure 13:
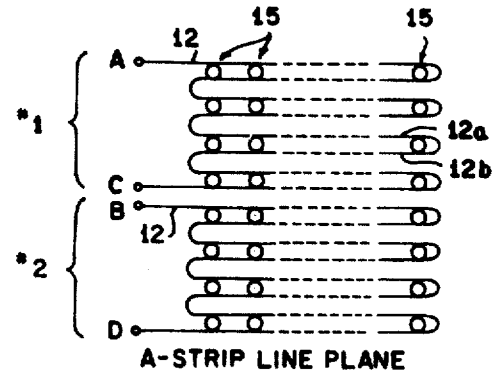
Figure 14:
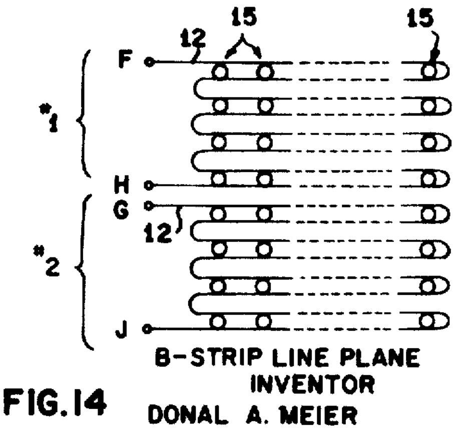

FIG. 2*a* is a fragmentary cross-sectional view illustrating a possible modification;

FIG. 3 is a plan view illustrating an intermediate step in the fabrication of a memory structure in accordance with the invention;

FIG. 4 is a cross-sectional view taken along the line 4—4 in FIG. 3;

FIG. 5 is an enlarged perspective view of a typical rod structure of FIGS. 3 and 4;

FIG. 6—8 illustrate a folded memory structure in accordance with the invention;

FIG. 8*a* illustrated a possible modification of the memory structures of FIGS. 6—8;

FIG. 9 (on the same sheet as FIG. 15) is an enlarged fragmentary view of FIG. 8 showing a rod structure and its associated strip line;

FIG. 10 is a series of graphs illustrating the hysteresis responses of the two magnetic elements of a typical digit for a destructive mode of operation;

FIG. 11 is a series of graphs illustrating the hysteresis responses of the two magnetic elements of a typical digit for a nondestructive mode of operation;

FIG. 12 is a schematic and electrical diagram illustrating how the work windings on the rods may be connected in a linear selection arrangement in a preferred embodiment of the invention;

FIGS. 13 and 14 illustrate the arrangement of the strip lines in a typical pair of strip line planes in a preferred embodiment of the invention; and transformer.

FIG. 15 is an electrical circuit diagram illustrating the manner in which the strip lines in FIGS. 13 and 14 are connected to respective drivers and to a respective digit sense amplifier transformer.

Like numerals designate like elements throughout the figures of the drawings.

The features of the invention will be brought out by describing in detail the construction of an exemplary memory in accordance with the invention. For the sake of simplicity and ease of understanding, the number of memory elements shown will be relatively small, but it will be readily apparent how the principles of the present invention can be directly applied for fabricating large size memories.

Figure 1:
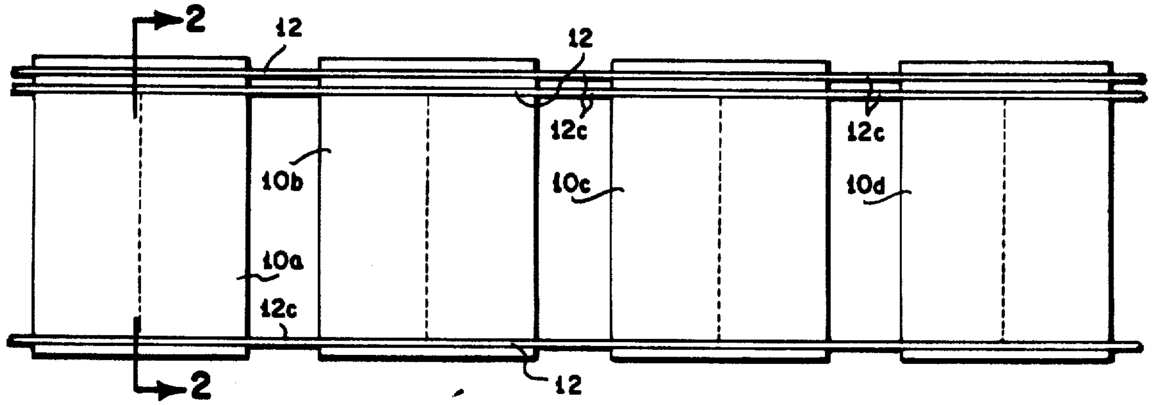
FIG. 1 is a plan view of an initial step in the fabrication of a memory structure in accordance with the invention.
Figure 2:
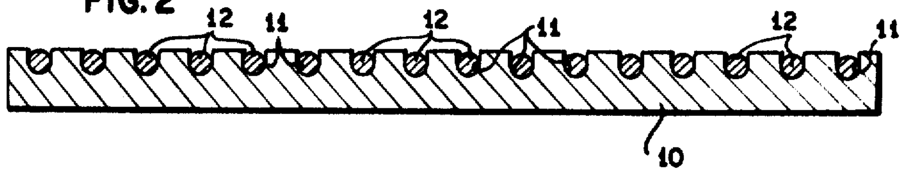

Referring to FIGS. 1 and 2, illustrated therein are initial steps in the construction of the memory. Four magnetic keeper planes 10*a*, 10*b*, 10*c* and 10*d* (FIG. 1) are arranged side by side with parallel strip lines 12 disposed thereon, preferably in respective grooves 11 (FIG. 2) provided in the keeper planes 10. Each magnetic keeper plane 10 may typically be a 1/16 inch thick sheet of high permeability magnetic material which may be made of, for example, pressed carbonyl iron powder, ferrite materials or a magnetic metal alloy such as permalloy. The grooves 11 in each keeper plane 10 may be provided by pressing in a mold, or by lapping and cutting. The parallel strip lines 12 may be made of round or rectangular copper wire of, for example, 0.005 mil diameter. The strip lines 12 can be held in grooves 11 by gluing or by the use of a self-bondage type wire. FIG. 2*a* illustrates an alternative technique in which no grooves are provided in the keeper planes 10, and the strip lines are rectangular wires 12' held in place by a suitable adhesive.

As illustrated in FIGS. 3 and 4, thin film magnetic rod structures 15 are next placed on alternate keeper planes 10*a* and 10*c* perpendicular to the strip lines 12. A typical rod structure 15 is illustrated in FIG. 5 and comprises: a long thin rodlike inner conductive substrate 13 preferably of beryllium copper having a diameter of 3 to 50 mils, a bistable magnetic thin film 14 suitably deposited on the substrate 13, and a closely wound solenoid winding 16 extending along the length of the rod. As best shown in FIGS. 4 and 5, one end 16*b* of the solenoid winding 16 is soldered to the substrate 13 at one end of the rod, and a lead wire 13*a* is soldered to the substrate 13 at the other end of the rod, which along with the unsoldered end 16*a* of the winding 16, serve as the input terminals for the rod structure 15. The soldering is preferably accomplished using the technique disclosed in the commonly assigned copending patent application Ser. No. 492,496, filed Oct. 4, 1965, in which a very thin gold or silver overcoating is provided over the magnetic thin film to facilitate soldering to the substrate. The thin magnetic film 14 may typically be a 500 to 10,000 angstrom electrodeposited coating of approximately 97 percent iron and 3 percent nickel, or a composition of 78 percent nickel, 19 percent iron, and 3 percent cobalt, or a bilayer of the type disclosed in Pat. No. 3,213,431, comprised of a 97 percent iron—3 percent nickel film and an 80 percent nickel—20 percent iron permalloy film.

Returning to FIG. 3, it will be understood that the rod structures on each of keeper planes 10*a* and 10*c* are preferably wired, via their input leads 13*a* and 16*a*, to a respective circuit board 19 containing their respective line diodes 21, drivers 22, and decoding circuitry 23, prior to their being placed on their respective keeper plane. As will become evident hereinafter, the cooperation of the keeper planes 10 with the rod structures permits placing the rod structures 15 very close together, and even touching, so as to permit achieving a high packing density. In order to obtain this high packing density, it may be desirable to divide the rod structures into alternate groups and drive one group from one end, and the other group from the other end; also, the rod structures may be alternated singularly.

The next step in the memory construction is to fold the strip lines at points 12*c* (FIG. 3) so that a stacked arrangement is obtained, as illustrated in FIGS. 6—8, such that keeper plane 10*b* is over keeper plane 10*a*, keeper plane 10*d* is over keeper plane 10*c*, and keeper planes 10*b* and 10*c* are adjacent. In order to illustrate how the invention can be extended to many rod planes, FIG. 8 shows a three-dimensional arrangement of eight keeper planes 10*a* to 10*h* providing four rod planes, instead of just the two exemplary rod planes shown in FIGS. 6 and 7 and in the previous figures. It will be understood that any rod structure is still readily available for replacement in the memory structure of FIG. 8, since any rod plane may be exposed simply by lifting the respective top keeper plane, in which case the bent portions 12*c* of the strip lines act as hinges.

It should be evident from FIGS. 6–8 that the memory of the present invention is particularly advantageous in that no solder connections are required for the strip lines 12 within the memory, no precise insertion or placement of the rod structures 15 are necessary, and the soldering for the rod structures 15, including soldering to their respective circuit boards 19, may be accomplished prior to their being placed on their respective keeper planes 10. It has been found that the keeper planes 10 may be folded directly against the rod structures 15 without damage, but spacers may be provided if desired, as illustrated, for example, at 26 in FIG. 7.

FIG. 8*a* illustrates a modified embodiment of the memory structure of FIGS. 6–8 in which one of the keeper planes 10′ is provided with grooves 15*a* for receiving the rod structures 15. As will be apparent from FIG. 8*a*, the strip line grooves for keeper plane 10′ are made of sufficient depth so as to be properly positioned with respect to the rod structures 15.

Having described the construction and arrangement of an exemplary strip line, folded rod memory structure in accordance with the invention, the manner in which storage and retrieval of data may be achieved in accordance with the invention will now be described.

Referring to the fragmentary view of FIG. 9 showing a portion of a rod structure 15 and a number of its strip lines 12, it will be understood that each magnetic element of the memory is constituted by the portion of a magnetic thin film in the immediate vicinity of the intersections between the solenoid winding 16 on the rod structure 15 and a respective pair of upper and lower strip lines 12*a* and 12*b*. Each rod structure 15 thus provides a plurality of bistable magnetic elements along its length, one for each intersection of the solenoid winding 16 on the rod structure 15 with a respective pair of upper and lower strip lines 12*a* and 12*b*.

For purposes of illustration, the operation of the memory will be described in connection with an exemplary two element per bit memory organization in which two magnetic elements are used to constitute each digit. The two magnetic elements representing each digit are preferably chosen as adjacent portions "A" and "B" (FIG. 9) on the same rod. Such a choice is highly advantageous, since these two adjacent portions can be expected to have very similar magnetic properties as a result of the fact that a rod can be fabricated under continuous, automatic procedures which produce highly uniform thin film coatings, particularly on the same rod, and most particularly on adjacent portions on the same rod. A typical manner in which such automatic fabrication can be provided is described in the article "The Magnetic Rod–A Cylindrical, Thin-film Memory Element" by D. A. Meier and A. J. Kolk, published on pages 195–212 in the book "Large-Capacity Memory Techniques for Computing Systems," edited by Marshall C. Yovits, The MacMillan Company, New York, 1962.

The manner in which the two adjacent magnetic elements A and B on a rod structure 15 (FIG. 9), which constitute a digit, may be operated to provide reading and writing of a binary or ternary digit for both destructive and nondestructive modes will now be considered with additional reference to the hysteresis loop graphs shown in FIGS. 10 and 11.

Referring first to FIG. 10 which corresponds to operation in the destructive mode, illustrated therein are three distinct combinational states which can be written into elements A and B during writing and uniquely sensed during reading, as illustrated by graphs I, II and III. In graph I, only element B is partially switched during writing ($P_0 \to P_1 \to P_2$) by applying coincident current signals $I_D$ and $I_W$ (neither of which is sufficient by itself to cause partial switching) to its respective strip lines 12*a* and 12*b* and solenoid winding 16 (FIG. 9); in graph II only element A is partially switched from its read saturation state during writing ($P_0 \to P_1 \to P_2$) by applying coincident current signals $I_D$ and $I_W$ to its respective strip lines 12*a* and 12*b* and solenoid winding 16 (FIG. 9); and in graph III neither element A nor B is switched from their read saturation state during writing ($I_D$=O).

The three combinational states for elements A and B illustrated in FIG. 10 are thus: (1) only element B partially switched, (2) only element A partially switched, and (3) neither A nor B partially switched. A fourth possible combinational state for elements A and B not illustrated in FIG. 10 is one in which both elements A and B are partially switched. However, since this state is indistinguishable during reading from the state in which neither A nor B is switched, and is less desirable from a driving circuit and noise viewpoint, it is not used in the embodiment being described herein. Also, it is to be understood that although full switching could be employed, partial switching is preferred because of its higher speed capability. For such partial switching, a hysteresis loop of squareness ratio greater than 0.8 is preferred.

Still referring to FIG. 10, the three combinational states which may be written into elements A and B can be uniquely sensed by the application of a read pulse $I_R$ to the solenoid winding 16 of elements A and B (FIG. 9), which is sufficient to drive each back to its read saturation state if partially switched. As will be described in detail hereinafter, the respective strip line windings 12*a* and 12*b* of the elements A and B of each digit are connected in the memory so that the driving of element B from its partially switched state back to its read saturation state ($P_2 \to P_3 \to P_0$) produces a positive output signal, while the driving of element A from its partially switched state back to its read saturation state produces a negative output signal, and the driving of an unswitched element in response to the read pulse ($P_0 \to P_3 \to P_0$) produces essentially no output signal. Thus, the three possible output indications in response to an applied read pulse are: (1) positive output signal, (2) negative output signal, and (3) no output signal, which respectively correspond to the three states which may be written into elements A and B: (1) only element B partially switched, (2) only element A partially switched, and (3) neither element A nor B partially switched, illustrated in graphs I, II and III, respectively.

It will now be understood that if it is desired that the elements A and B represent a binary digit, only two combinational states of elements A and B are required to represent the two binary digits which may arbitrarily be designated as "1" and "0." Combinational states I and II are preferred, since it is easier to distinguish between positive and negative output pulses than between an output pulse and no output pulse. If it is desired that the elements A and B represent a ternary digit, than all three combinational states I, II and III of elements A and B are required to represent the three ternary digits which may arbitrarily be designated as "1," "0" and "−1."

Considering now that the nondestructive mode illustrated in FIG. 11, it will be understood that any of the three combinational states of FIG. 10 may be written into elements A and B of the typical digit shown in FIG. 9. FIG. 11 shows how each of the three combinational states may be read in a nondestructive manner in accordance with the invention, graphs I, II and III corresponding to the same combinational states in both of FIGS. 10 and 11. Nondestructive read out is accomplished by applying a read pulse $I_R'$ to the solenoid winding 16 of elements A and B (FIG. 9), as is done for destructive read out. However, for nondestructive read out, the read pulse $I_R'$ is chosen so as to cause a partially switched element (residing at $P_2$) to only momentarily be driven out of its partially switched state and to return to its partially switched state when the read pulse $I_R'$ is removed ($P_2 \to P_4 \to P_2$). It is significant to note that such nondestructive operation is primarily based on the difference in incremental permeability between the states of elements A and B and not on a rotation of the magnetization vector as is used to obtain a nondestructive capability in certain prior art memories.

Generally, such nondestructive operation based on the difference in incremental permeability between the states of elements A and B is difficult to utilize because: (1) only a relatively small flux change and thus a small output signal is ordinarily to be expected, (2) it is difficult to obtain a sufficiently low noise level in a memory to permit reliable detection of the nondestructive output signal, and (3) it is difficult to avoid disturb effects which could cause a partially switched element to step back to its unswitched state after a given number of applied read pulses. The memory construction of the present invention, using magnetic keeper planes surrounding the rods and strip lines, provides a highly concentrated low reluctance flux path for axial mode switching operation of the rod, which not only provides a highly advantageous solution to the above problems with regard to nondestructive read out based on the difference in incremental permeability, but also significantly improves the performance capabilities of the rod for destructive read out operation.

Returning to the nondestructive operation illustrated in FIG. 11, it will be evident that any of the three possible combinational states written into elements A and B of a typical digit (FIG. 9) can be read out without destruction thereof ($P_s \to P_s \to P_s$) by the application of a read pulse $I_R'$ appropriately chosen for nondestructive operation. As for FIG. 10, the nondestructive mode produces a positive output signal for the combinational state of only element B partially switched, as shown in graph I, a negative output signal for the combinational state of only element B partially switched, as shown in graph II, and no output signal for the combinational state of neither element A nor B partially switched.

Having explained how storage and nondestructive or destruction read out of either a binary or a ternary digit may be provided by appropriate application of currents to the respective strip lines 12 and solenoid winding 16 of two adjacent rod elements A and B (FIG. 9), a specific exemplary two element per digit organization for binary storage and either destructive or nondestructive read out will next be described with reference to FIGS. 12–15.

This organization will be of the type disclosed in the commonly assigned copending patent application Ser No. 560,478, filed June 27, 1966. For such an organization two memory structures of the type disclosed in FIG. 8 are used, one on top of the other, each having four rod planes and each rod structure 15 being used to store one eight-digit word. This means that the 16 magnetic elements of each rod structure are divided into eight pairs of magnetic elements, each pair comprising an A element and a B element, as illustrated for the typical digit in FIG. 9. The solenoid windings 16 on the rods thus become the word windings, and the strip lines 12 are used both as digit and sense lines, as will now be described in detail. For the purpose of this description, it will be assumed that each rod plane contains 12 rod structures.

The connection and arrangement of the word windings will be considered first with reference to FIG. 12, which illustrates how the word windings can be connected in a conventional linear selection arrangement. Since two memory structures of the type shown in FIG. 8 are used, there will be a total of eight rod planes, the top four rows of rods in FIG. 12 being from one memory structure which will be designated at 01, and the bottom four rows of rods being from the other memory structure which will be designated as 02. As shown in FIG. 12, the leads 16*a* from the rod structures in each of the eight rows are connected together and to a respective one of the eight row grounders $R_1$–$R_8$, while the leads 13*a* from the rod structures in each column are connected together and to a respective one of the 12 column drivers $C_1$–$C_{12}$ through a respective pair of oppositely poled diodes 17 and 18. Column drivers $C_1$–$C_{12}$ are constructed and arranged to operate in response to a signal 20*a* from a column selector 20 to cause a selected column driver to provide a DRO (destructive read out) current $I_R$, a NDRO (nondestructive read out) current $I_R'$, or a write current $I_W$, in accordance with corresponding signals applied to column selector 20. Row grounders $R_1$–$R_8$ are constructed and arranged to operate during read and write intervals to ground a selected row line, whereby to provide a completed path for the current provided by the selected column driver.

It will be understood that such a connection of windings as shown in FIG. 12 (conventionally referred to as a linear selection arrangement) permits the word windings of a single predetermined rod word line 13*a*, 16*a* to be selected to receive a read or write current. This is accomplished by activating the column driver and row grounder which correspond to the row-column coordinates of the rod structure which is to be selected. For example, selection of column driver $C_1$ and row grounder $R_1$ during a reading operation will result in a lead current ($I_R$ or $I_R'$) flowing only in the word winding of the rod structure in row 1 and column 1, since only this word winding will have a completed path for the flow of read current ($I_R$ or $I_R'$) from $C_1$ to $R_1$. As is well known with regard to linear selection systems, diodes 17 and 18 (one for the read current $I_R$ or $I_R'$ and the other for the write current $I_W$) are provided for each column driver in order to prevent sneak currents from flowing in unselected lines From the foregoing description of FIG. 12, it should now be evident that the read and write currents $I_R$ or $I_R'$ and $I_W$ required during reading and writing into and out of the binary digits or bits on a selected rod structure (as previously described) may readily be provided in a conventional manner. It is merely necessary to design the column drivers and row grounders so as to be individually selectable (such as by row selector 24 and column selector 20 in FIG 12) to supply read and write currents $I_R$ or $I_R'$ and $I_W$ during respective read and write periods in accordance with the row-column coordinates of the selected rod structure.

Now that the linear selection interconnection arrangement of the rod word windings has been explained, the interconnection arrangement employed for the digit-sense lines will next be considered with reference to FIGS. 13–15 It will be remembered that the digit-sense lines perform the digit function during writing, and the sensing function during reading, so that the interconnection arrangement must take this into account. Also, the interconnection arrangement must provide for appropriate noise cancellation.

Referring to FIGS. 13–15, illustrated therein is a digit-sense line connection arrangement suitable for two element per bit binary storage using the combinational states I and II of FIGS. 10 and 11 in which the partial switching of one element represents one binary digit, and the partial switching of the other element represents the other binary digit. For the purposes of FIGS. 13–15, it will be assumed that a "1" is represented by element A partially switched, and a "0" by element B partially switched.

It will be understood that, since each rod structure contains 16 magnetic elements along its length (corresponding to one eight-digit word), there will be 16 strip line planes in the overall memory. These 16 strip line planes are arranged so that a respective pair of strip line planes (designated A and B in FIGS. 13 and 14) is provided corresponding to each respective digit along the rod. FIG. 13 illustrates a typical one of the eight A strip line planes, and FIG. 14 illustrates a typical one of the eight B strip line planes. Each A strip line plane (FIG. 13) contains the strip lines 12 which couple the A magnetic rod elements (see also FIG. 9), while each B strip line plane (FIG. 14) contains the strip lines 12 which couple the corresponding B magnetic rod elements As illustrated in FIGS. 13 and 14, each A or B strip line plane contains two strip lines 12, one from each of the two FIG. 8 memory structures 01 and 02 which are used in the overall memory. For purposes of identification, the strip line terminals in FIGS. 13 and 14 have been designated so that: in each A plane, the strip line from memory structure 01 is across terminals AC, and the strip line from memory structure 02 is across terminals BE; and in each B plane, the strip line from memory structure 01 is across terminals FH, and the strip line from memory structure 02 is across terminals GJ.

FIG. 15 illustrates the manner in which the strip lines AC, BE, GJ, and FH in FIGS. 13 and 14 (shown as inductances in FIG. 15) may be connected to a respective digit sense amplifier transformer 50. It will be understood that a similar connection arrangement to a respective digit sense amplifier transformer is provided for each of the other seven pairs of planes. The transformer 50 has three windings 51, 52 and 53, a "dot" being provided at one end of each transformer winding in a conventional manner to indicate the winding polarity. In this description, the "dot" will be considered to represent a positive polarity. As shown in FIG. 15, transformer winding 51 is connected across terminals F and G, transformer winding 52 is connected across terminals A and B (terminals A and G and B and F being connected in the same polarity sense), and transformer winding 53 is fed to the sense amplifier (not shown). Transformer windings 51 and 52 are center-tapped and each center tap is connected to circuit ground through an impedance Zo/2. Zo is the characteristic impedance of the respective digit-sense lines connected thereto and serves to prevent unwanted reflections.

At the lower right in FIG. 15, the manner in which digit current is applied to the digit-sense lines of planes A and B is illustrated. It will be seen that plane A is provided with an A plane driver 40 and plane B is provided with a B plane driver 60, each driver being capable of providing an output current pulse $2I_D$ in response to a signal received from a digit plane selector 75. It will be understood that only one of the A and B drivers 40 and 60 is activated by the selector 75 to provide an enabling output current of $2I_D$ during a writing interval, depending on whether a "0" or a "1" is to be written into the respective digit. The unselected drivers are caused to either provide no output current, or else an inhibiting current of $-2I_D$, the latter being preferable for NDRO operation and also for some forms of DRO operation. As indicated in FIG. 15, the digit current $2I_D$ produced by each driver when activated, is fed in parallel to the two digit-sense lines in the selected plane through respective suitably matched isolating diodes (41 and 42 for plane A and 61 and 62 for plane B). Since the driver current of $2I_D$ divides equally between the two strip lines in the selected plane, the resulting digit current flowing in each strip line will be of value $I_D$ in accordance with the previously described writing operation. An impedance of 2Zo (where Zo is again the characteristic impedance) is connected across terminals C and E and across terminals H and J in FIG. 15 in order to provide proper line terminating impedances which will eliminate reflections.

The overall operation of the memory will now be illustrated by describing an example of typical operation involving the rod structure involving the rod structure in row 1 and column 1, which will be assumed to store the 8-bit word 10111010.

Operation may be considered to be initiated by the appearance of either a NDRO or DRO read signal (depending on whether nondestructive or destructive read out is desired) which is applied to the row selector 24 and the column selector 20 in FIG. 12 along with respective row and column data to permit selection of the desired row grounder and column driver during the reading operation. Since the rod structure in row 1 and column 1 is the selected one in the present example, the row selector 24 will select row grounder $R_1$ while the column selector 20 will select column driver $C_1$. As a result, a read current ($I_R$ or $I_R'$) will flow from column driver $C_1$, through its respective diode 17, through the helical word winding 16 (see FIGS. 6–9) of the rod structure in column 1 and row 1, and back to circuit ground through row grounder $R_1$ (FIG. 12). The effect of a DRO read current $I_R$ flowing in the word winding 16 of the selected rod structure is to cause all of the sixteen magnetic rod elements thereon to end up at $P_0$ as shown in graphs I and II of FIG. 10, while a NDRO read current $I_R'$ leaves each of the 16 magnetic rod elements in the same state at either $P_0$ or $P_2$, as shown in graphs I and II of FIG. 11.

Since in the present example it is assumed that the row 1, column 1 rod structure stores the word 10111010, the A magnetic elements of the first, third, fourth, fifth and seventh digits, and the B magnetic elements of the second, sixth and eight digits will each be at $P_2$ (FIGS. 10 and 11) prior to reading, while the other element of each will be at $P_0$. Thus, in response to an applied read current $I_R$ or $I_R'$, an output signal will be induced across terminals AC (FIG. 13) in the A plane of each of the first, third, fourth, fifth and seventh digits, and across terminals FH (FIG. 14) in the B plane of each of the second, sixth and eighth digits. Since terminals AC are connected to the dotted end of transformer winding 52, as illustrated in FIG. 15, while terminals FH are connected to the undotted end of transformer winding 51, it will be understood that a stored "1" (as in the first, third, fourth, fifth and seventh digits of the selected word) produces a positive output signal at the output of transformer winding 53, while a stored "0" (as in the second, sixth and eighth digits of the selected word) produces a negative output signal (FIGS. 10 and 11).

So far in this example, it has been shown how, during reading of a selected word, a positive "1" output signal (FIG. 10) is applied to each respective bit sense amplifier if the corresponding digit stores a "1," and a negative "0" output signal (FIG. 10) if the corresponding digit stores a "0."

It will be understood that if a NDRO reading operation is performed on the selected rod, as typically illustrated in graphs I and II of FIG. 11, then the stored information is maintained, no writing operation is required, and operation may immediately proceed to another reading operation.

If a DRO reading operation is performed, a writing operation is necessary before proceeding to the next reading operation in order to restore the destroyed data, or to write in new data. Such a writing operation may be initiated following the DRO reading operation by applying a write signal to the row selector 24 and column selector 20 in FIG. 12, along with respective row and column data to permit selection of the desired row grounder and column driver. Since the rod structure in row 1 and column 1 is the selected one in the present example, the row selector 24 will select row grounder $R_1$, while the column selector 20 will select column driver $C_1$, causing a write current $I_W$ to flow through the word winding of the selected rod structure in row 1 and column 1.

It will be remembered that neither the write current $I_W$ nor the digit current $I_D$, by itself, is sufficient for switching, and that the coincidence of both is necessary. Accordingly, having explained in the previous paragraph how the write current $I_W$ is obtained, reference is now directed to FIG. 15 which illustrates how the digit current $I_D$ is obtained for a typical digit.

It will be seen in FIG. 15 that the write signal (which may be the same as applied to the row selector 24 and column selector 20 in FIG. 5) is also applied to a digit plane selector 75 along with digit plane data to indicate, in accordance with the word to be written, which of the A or B plane drivers 40 and 60 provided for each digit is to be selected during writing. If a "1" is to be written, the A driver 40 is selected, and if a "0" is to be written the B digit driver is selected. Also, as mentioned previously, for NDRO operation and some DRO modes it has been found preferable to provide an inhibiting current $-2I_D$ from the unselected driver. Thus, if it is assumed that the 01011000 word is to be written into the row 1, column 1 rod structure, then the A drivers of the second, fourth and fifth digits and the B drivers of the first, third, sixth, seventh, and eighth digits will be selected during the writing operation by digit plane selector 75 to provide an aiding current of $2I_D$, while the unselected drivers will either provide no output current, or will be caused to provide an inhibiting current of $-2I_D$.

The above described embodiment of the invention is particularly desirable and is capable, for example, of operating at a 10 megahertz speed for read-write cycles, and at a 20 megahertz speed for nondestructive read cycles.

it is to be understood that the memory construction of the present invention is not limited to the two element per digit embodiment described, but is also capable of advantageous use in other types of memories including one element per digit memory organizations. Accordingly, since many changes may be made in the construction, arrangement and use of the invention, the invention should be considered as including all possible variations and modifications coming within the scope of the invention as defined in the appended claims.

What is claimed is:

1. In a magnetic memory, first and second closely adjacent planes of magnetic material, a plurality of parallel rod structures disposed between said planes, and a plurality of parallel conductive wires disposed between said rod structures and one of said planes and perpendicular to said rod structures, each rod structure comprising a substrate having a bistable magnetic thin film coated thereon and a solenoid winding wound along a substantial length of the rod.

2. The invention in accordance with claim 1, wherein said substrate is conductive, and wherein one end of each solenoid winding is electrically connected to one end of its respective substrate.

3. The invention in accordance with claim 1, wherein said magnetic thin film has a thickness of 500 to 10,000 angstroms.

4. In a magnetic memory, first and second closely adjacent planes of magnetic material, a plurality of long thin parallel magnetic rod structures disposed between said planes, a first plurality of parallel conductive wires disposed between said rod structures and one of said planes and perpendicular to said rod structures, and a second plurality of parallel conductive wires disposed between said rod structures and the other of said planes and perpendicular to said rod structures and in alignment with said first plurality of conductive wires, each of said rod structures comprising a substrate having a thin bistable magnetic thin film coated thereon and a solenoid winding wound along a substantial length of the rod structure.

5. The invention in accordance with claim 4, wherein grooves are provided in said planes for receiving said conductive wires.

6. The invention in accordance with claim 4, wherein grooves are provided in one of said planes for receiving said rod structures.

7. The invention in accordance with claim 4, wherein each rod structure has a diameter of 3 to 50 mils, and wherein said magnetic thin film has a thickness of 500 to 10,000 angstroms.

8. The invention in accordance with claim 4, wherein said substrate is conductive, wherein one end of said solenoid winding is soldered to one end of said substrate.

9. The invention in accordance with claim 4, wherein each conductive wire of said first plurality and the aligned conductive wire of said second plurality comprise a single unbroken conductive wire having a bend at an intermediate portion thereof.

10. In a magnetic memory system, first and second closely adjacent planes of magnetic material, a plurality of long thin parallel magnetic rod structures disposed between said planes, a first plurality of parallel conductive wires disposed between said rod structures and one of said planes and perpendicular to said rod structures, a second plurality of parallel conductive wires disposed between said rod structures and the other of said planes and perpendicular to said rod structures and in alignment with said first plurality of conductive wires, each of said rod structures comprising a substrate having a thin bistable magnetic thin film coated thereon and a solenoid winding wound along a substantial length of the rod structure, and circuit means coupled to said conductive wires and to the solenoid windings of said rod structures, said circuit means including first means for writing data in a thin film magnetic portion by producing one of two predetermined axial magnetization conditions therein, second means for reading data from a thin film magnetic portion by applying thereto a substantially axial magnetic field sufficient to produce a disturbing effect when the thin film portion is in a particular one of said two predetermined conditions, and third means for detecting the occurrence of said disturbing effect.

11. The invention in accordance with claim 10, wherein said magnetic thin film has a thickness of 500 to 10,000 angstroms.

12. The invention in accordance with claim 10, wherein said circuit means are constructed and arranged to provide two element per digit operation with the two elements corresponding to each digit being constituted by adjacent elements on the same rod structure.

13. The invention in accordance with claim 10, wherein the substantially axial magnetic field produced by said second means is chosen so that upon removal thereof the thin film portion remains in the same axial magnetization condition.

14. In a magnetic memory, a first pair of closely adjacent magnetic planes, a second pair of closely adjacent magnetic planes adjacent said first pair, a first plurality of parallel rod structures disposed between said first pair of planes, a second plurality of parallel rod structures disposed between said second pair of planes, and a plurality of unbroken parallel conductive wires, each wire passing between the planes of said first pair in a direction perpendicular to said first plurality of rod structures and being bent over to pass between the planes of said second pair in a direction perpendicular to said second plurality of rod structures, each rod structure comprising a substrate having a bistable magnetic thin film coated thereon and a solenoid winding wound along a substantial length of the rod.

15. The invention in accordance with claim 14, wherein one end of each solenoid winding is electrically connected to one end of its respective substrate.

16. In a magnetic memory, a first pair of closely adjacent magnetic planes, a second pair of closely adjacent magnetic planes adjacent said first pair, a first plurality of parallel rod structures disposed between said first pair of planes, a second plurality of parallel rod structures disposed between said second pair of planes, and a plurality of unbroken parallel conductive wires, each wire passing between one side of said first plurality of rod structures and a plane of said first pair and then being bent over so as to pass between the other side of said first plurality of rod structures and the other plane of said first pair, and then being bent over again so as to pass between one side of said second plurality of rod structures and a plane of said second pair and then being bent over again so as to pass between the other side of said second plurality of rod structures and the other plane of said second pair, the portions of each wire passing between each pair of planes being perpendicular to the rod structures therein, each rod structure comprising a substrate having a bistable magnetic thin film coated thereon and a solenoid winding wound along a substantial length of the rod.

17. The invention in accordance with claim 16, wherein one end of each solenoid winding is electrically connected to one end of its respective substrate, and wherein a lead wire is electrically connected to the other end of each substrate.

18. The invention in accordance with claim 16, wherein the bent over portions of said conductive wires serve as hinges to permit pivoting open any pair of planes to expose the rod structures therein.

19. In a magnetic memory, a first pair of closely adjacent magnetic planes, a second pair of closely adjacent magnetic planes adjacent said first pair, a first plurality of parallel rod structures disposed between said first pair of planes, a second plurality of parallel rod structures disposed between said second pair of planes, each rod structure comprising a substrate having a bistable magnetic thin film coated thereon and a solenoid winding wound along a substantial length of the rod, a plurality of unbroken parallel conductive wires, each wire passing between one side of said first plurality of rod structures and a plane of said first pair and then being bent over so as to pass between the other side of said first plurality of rod structures and the other plane of said first pair, and then being bent over again so as to pass between one side of said second plurality of rod structures and a plane of said second pair and then being bent over again so as to pass between the other side of said second plurality of rod structures and the other plane of said second pair, the portions of each wire passing between each pair of planes being perpendicular to the rod structures therein, writing means coupled to said conductive wires and to the solenoid windings on said rod structures for writing data into a selected thin film magnetic portion of a selected rod structure by switching the selected thin film portion in one of two predetermined axial magnetization conditions, reading means coupled to the solenoid windings of said rod structures for applying a substantially axial magnetic field to a selected thin film magnetic portion of a selected rod structure sufficient to produce a disturbing effect when the selected thin film is in one of said two predetermined conditions, and sensing means coupled to said conductive wires for sensing said disturbing effect.

20. The invention in accordance with claim 19, wherein said thin film has a thickness of 500 to 10,000 angstroms.

21. In a method of making a magnetic memory structure, the steps of: arranging a plurality of magnetic planes side-by-side, disposing a plurality of parallel conductive wires across said planes, providing a plurality of magnetic rods each comprising a long thin rodlike substrate having a bistable magnetic thin film coated thereon, winding a solenoid along a substantial length of each rod, placing a predetermined plurality of said rods on each of alternate planes in a direction perpendicular to said conductive wires, and folding said conductive wires and planes so that each predetermined plurality of rods is sandwiched between a respective pair of said planes with a plurality of said conductive wires between each plane and said rods.

22. The invention in accordance with claim 21, wherein the step of electrically connecting one end of said solenoid to one end of said substrate of each rod is performed prior to placing said rods in said planes.